United States Patent Office 3,318,884
Patented May 9, 1967

3,318,884
SUBSTITUTED 6 - AMINO-6-DEMETHOXYTHEBA-
INE AND 6 - AMINO-6-DEMETHOXYORIPAVINE
DERIVATIVES
John J. Brown, Pearl River, N.Y., Robert Allis Hardy, Jr.,
Ridgewood, N.J., and Carol Therese Nora, Spring Val-
ley, N.Y., assignors to American Cyanamid Company,
Stamford, Conn., a corporation of Maine
No Drawing. Filed Dec. 3, 1965, Ser. No. 511,345
10 Claims. (Cl. 260—247.2)

This application is a continuation-in-part of our co-pending application Ser. No. 473,829, filed July 21, 1965, now abandoned.

This invention relates to novel dienamines derived from certain of the opium alkaloids and, more particularly, is concerned with novel substituted 6-amino-6-demethoxythebaine and 6-amino-6-demethoxyoripavine derivatives, and with novel methods of preparing these compounds. The novel substituted 6-amino-6-dimethoxythebaine and oripavine compounds of the present invention may be represented by the following general formula:

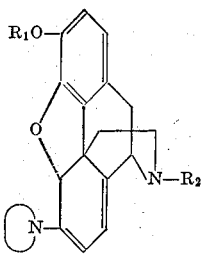

wherein $R_1$ is hydrogen, lower alkyl or lower alkanoyl; $R_2$ is hydrogen, cyano, proparagyl, lower alkyl, lower aralkyl, lower alkenyl or lower cycloalkylmethyl; and

is pyrrolidinyl, piperidino, morpholino or di(lower alkyl)amino. Suitable lower alkyl and lower alkanoyl groups contemplated by the present invention are those having up to about 4 carbon atoms. Suitable lower aralkyl groups contemplated by the present invention are benzyl, phenethyl, and the like. Suitable lower alkenyl groups contemplated by the present invention are those having up to about 6 carbon atoms such as, for example, allyl, methallyl, dimethallyl, etc. Suitable lower cycloalkylmethyl groups contemplated by the present invention are those having from 4 to 7 carbon atoms such as, for example, cyclopropylmethyl, cyclobutylmethyl, cyclopentylmethyl, cyclohexylmethyl, etc.

The novel compounds of the present invention are usually obtainable as oils having characteristic spectral properties. In particular, the infra red spectra generally show absorption in the 6.3–6.4 micron region, and the nuclear magnetic resonance spectra show the expected patterns for the two olefinic protons characteristic of this dienamine structure. When pure, some of these compounds may be obtained as crystalline products with characteristic ultraviolet absorption spectra. They are appreciably soluble in many organic solvents such as ethanol, chloroform, benzene, ethyl acetate, and the like. They are, however, generally insoluble in water.

The organic bases of this invention contain the dienamine moiety which is a reactive function. By virtue of this reactivity, these compounds are valuable intermediates for further transformation as set forth in detail below. However, it is also well known that dienamines may be hydrolyzed to the parent unsaturated ketones. Thus, extended contact of the novel 6-amino-6-demethoxythebaine and oripavine derivatives of this invention with hydroxylic solvents such as water may decompose them, forming the codeinone and morphinone derivatives from which they are prepared. These novel intermediates are, therefore, isolated promptly, stored under anhydrous conditions, and used as intermediates without delay, generally under anhydrous conditions.

The novel 6-demethoxy-6-aminothebaine and oripavine compounds of the present invention are useful as intermediates in the preparation of a variety of novel 6,14-endoethenocodides and morphides such as 7-substituted-7, 8-dihydro-6-amino - 6,14 - endoethenocodides and morphides, which possess analgestic activity, as is set forth in greater detail in our copending applications Ser. No. 511,344 and 511,365, filed concurrently herewith. For example, treatment of an appropriately substituted 6-demethoxy-6-aminothebaine with a dienophile such as acrylonitrile, acrolein, ethyl acrylate, acrylamide, phenyl vinyl ketone or methyl vinyl ketone furnishes the corresponding 7-cyano-, 7-formyl-, 7-carbethoxy-, 7-carbamyl-, 7-benzoyl-, or 7-acetyl - 7,8-dihydro-6-amino-6,14-endoethenocodide.

The novel compounds of the present invention may be readily prepared by treating an appropriately substituted codeinone or morphinone derivative (I) with a secondary amine in accordance with the following reaction scheme:

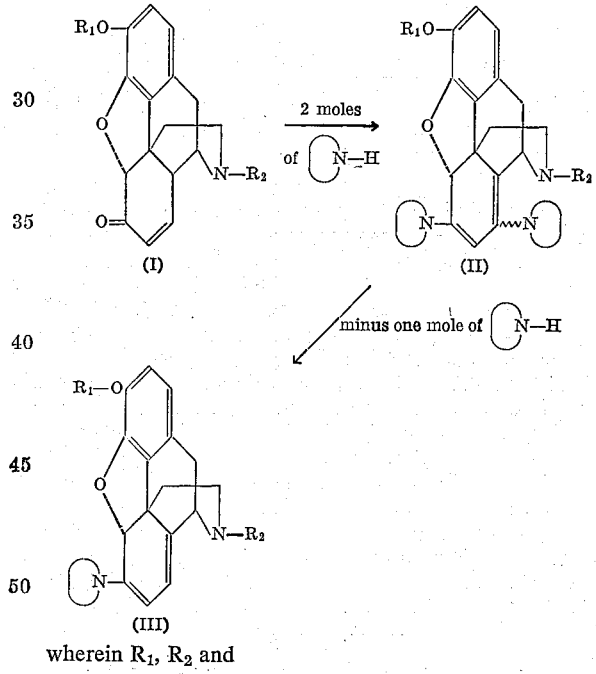

wherein $R_1$, $R_2$ and

are as hereinabove defined. It is not necessary to isolate the intermediate 6,8-bis-(tertiary amino) derivatives (II), which may be obtained as oils and used without further purification. However, the isolation of these intermediate 6,8-bis(tertiary amino) derivatives (II) may be useful in certain cases. In particular, the treatment of codeinone with excess pyrrolidine in methanol gives the 6,8-bis-(1-pyrrolidinyl)-Δ⁶-codide methanolate as a white crystalline product which is readily isolated from the reaction mixture.

The conversion of the substituted codeinone or morphinone derivatives (I) to the intermediate 6,8-bis(tertiary amino) derivatives (II) may be conveniently carried out in an inert solvent, such as methanol, ethanol, isopropanol, n-butanol, benzene, etc. at a temperature of from about 25° C. to about 150° C. However, the refluxing temperature of the solvent, such as methanol or ethanol, is the preferred temperature in order to insure a substantially complete reaction. The conversion of the 6,8-bis-(tertiary amino) derivatives (II) to the dienamines (III) is best carried out by heating the intermediates (II) in an inert solvent such as benzene, toluene, and the like at a temperature of from about 80° C. to about 150° C. until the reaction is substantially complete (usually one to several hours). The dienamine product is promptly separated from the reaction mixture by standard methods well known in the art.

It is to be understood that the novel compounds of the present invention may exist in a number of stereoisomeric forms since they possess asymmetric carbon atoms. All such stereoisomeric forms of the substituted 6-amino-6-demethoxythebaines and oripavines are included within the purview of the present invention.

The invention will be described in greater detail in conjunction with the following specific examples.

EXAMPLE 1

*Preparation of 6,8-bis-(1-pyrrolidinyl)-$\Delta^6$-codide methanolate*

Pyrrolidine (4 ml.) is added slowly with stirring to a suspension of codeinone (4 g.) in hot methanol (40 ml.) under nitrogen. The reaction mixture is then allowed to cool to room temperature during which time the product crystallizes. The mixture is then kept at 0–5° C. for 1–2 hours. The crystalline product is collected, washed with methanol, and air-dried to give 6,8-bis-(1-pyrrolidinyl)-$\Delta^6$-codide methanolate (3.57 g.), M.P. 112–114° C. dec. A freshly prepared sample shows infrared absorption at 6.15 microns (in chloroform solution), and the nuclear magnetic resonance spectrum shows the pattern characteristic for one olefinic proton (at C–7).

*Analysis.*—Calcd. for $C_{27}H_{39}N_3O_3$: C, 71.49; H, 8.67; N, 9.26. Found: C, 71.38; H, 8.81; N, 9.25.

EXAMPLE 2

*Preparation of 6-demethoxy-6-(1-pyrrolidinyl)thebaine*

A solution of 6,8-bis(1-pyrrolidinyl)-$\Delta^6$-codide (245 mg.) in anhydrous benzene (25 ml.) is heated under reflux for four hours. Solvent is removed, giving an oil which is crystallized by trituration with ether. Collection with n-hexane affords product (112 mg., M.P. 117–120° C. which is recrystallized with n-hexane giving 6-demethoxy-6-(1-pyrrolidinyl)thebaine having M.P. 121–123° C., infrared absorption at 6.38 $\mu$, and ultraviolet absorption at $\lambda_{max}$. 338 m$\mu$, $\epsilon$=9650. The nuclear magnetic resonance spectrum supports the structure and shows specifically two olefinic protons (at C–7 and C–8).

*Analysis.*—Calcd. for $C_{22}H_{26}N_2O_2$: C, 75.40; H, 7.48; N, 7.99. Found: C, 75.79; H, 7.57; N, 7.92.

EXAMPLE 3

*Preparation of 6-demethoxy-6-(1-pyrrolidinyl)thebaine*

Pyrrolidine (1 ml.) is added slowly with stirring to a suspension of codeinone (1 g.) in hot methanol (10 ml.) under nitrogen. The reaction mixture is allowed to stand for about one hour, and the solvent is evaporated. The resulting residue is then heated under reflux in benzene for four hours. Solvent is removed giving an oil which is crystallized by trituration with ether. Collection with n-hexane gives 6-demethoxy-6-(1-pyrrolidinyl)thebaine.

EXAMPLE 4

*Preparation of 6-demethoxy-6-morpholinothebaine*

A mixture of codeinone (200 mg.), morpholine (1 ml.) and methanol (10 ml.) is heated in an autoclave at a temperature of from 100° C. to 105° C. for 18 hours. Evaporation of solvent gives an oil. This oil is heated under reflux in benzene (10 ml.) for four hours, and solvent is removed giving 6-demethoxy-6-morpholinothebaine as an oil with infrared absorption at 6.33 $\mu$. The nuclear magnetic resonance spectrum of this oil supports the structure and shows olefinic protons at C–7 and C–8.

EXAMPLE 5

*Preparation of 6-demethoxy-6-morpholinothebaine*

A solution of codeinone (500 mg.), morpholine (1.5 ml.), and n-butanol (25 ml.) is heated under reflux for 16 hours. Evaporation of solvent gives an oil. This oil is heated under reflux in benzene for four hours, and solvent is removed giving 6-demethoxy-6-morpholinothebaine.

EXAMPLE 6

*Preparation of 6-demethoxy-6-(1-pyrrolidinyl)oripavine*

The general procedure of Example 3 is repeated. By treatment of morphinone with an excess of pyrrolidine, followed by heating in benzene, 6-demethoxy-6-(1-pyrrolidinyl)oripavine is thereby obtained.

EXAMPLE 7

*Preparation of 6-demethoxy-6-(1-pyrrolidinyl)northebaine*

By following the procedure of Example 3 except that an equivalent amount of norcodeinone is used in place of the codeinone of that example, there is obtained 6-demethoxy-6-(1-pyrollidinyl)northebaine.

EXAMPLE 8

*Preparation of 6-demethoxy-6-(1-pyrrolidinyl) nororipavine*

By following the procedure of Example 3 except that an equivalent amount of normorphinone is used in place of the codeinone of that example, there is obtained 6-demethoxy-6-(1-pyrrolidinyl)nororipavine.

EXAMPLE 9

*Preparation of N-cyano-6-demethoxy-6-(1-pyrrolidinyl) northebaine*

By following the procedure of Example 3 except that an equivalent amount of N-cyanonorcodeinone is use in place of the codeinone of that example, there is obtained N-cyano-6-demethoxy-6-(1-pyrrolidinyl)northebaine.

EXAMPLE 10

*Preparation of N-cyano-6-demethoxy-6-(1-pyrrolidinyl) nororipavine*

By following the procedure of Example 3 except that an equivalent amount of N-cyanonormorphinone is used in place of the codeinone of that example, there is obtained N-cyano-6-demethoxy-6-(1-pyrrolidinyl)nororipavine.

EXAMPLE 11

*Preparation of 3-acetyl-6-demethoxy-6-(1-pyrrolidinyl) oripavine*

The general procedure of Example 3 is repeated. By treatment of 3-acetylmorphinone with an excess of pyrrolidine, followed by heating in benzene, 3-acetyl-6-demethoxy-6-(1-pyrrolidinyl)oripavine is thereby obtained.

EXAMPLE 12

*Preparation of N-allyl-6-demethoxy-6-(1-pyrrolidinyl) northebaine*

The general procedure of Example 3 is repeated. By treatment of N-allylnorcodeinone with an excess of pyrrolidine, followed by heating in benzene, N-allyl-6-demethoxy-6-(1-pyrrolidinyl)northebaine is thereby obtained.

EXAMPLE 13

*Preparation of N-allyl-6-demethoxy-6-(1-pyrrolidinyl) nororipavine*

The general procedure of Example 3 is repeated. By treatment of N-allylnormorphinone with an excess of pyrrolidine, followed by heating in benzene, N-allyl-6-demethoxy-6-(1-pyrrolidinyl)nororipavine is thereby obtained.

EXAMPLE 14

*Preparation of N-cyclopropylmethyl-6-demethoxy-6(1-pyrrolidinyl)northebaine*

The general procedure of Example 3 is repeated. By treatment of N-cyclopropylmethylnorcodeinone with an excess of pyrrolidine, followed by heating in benzene, N-cyclopropylmethyl - 6 - demethoxy-6-(1 - pyrrolidinyl)northebaine is thereby obtained.

EXAMPLE 15

*Preparation of N-cyclopropylmethyl-6-demethoxy-6(1-pyrrolidinyl)nororipavine*

The general procedure of Example 3 is repeated. By treatment of N-cyclopropylmethylnormorphinone with an excess of pyrrolidine, followed by heating in benzene, N-cyclopropylmethyl - 6 - demethoxy - 6 - (1-pyrrolidinyl) nororipavine is thereby obtained.

EXAMPLE 16

*Preparation of 3-acetyl-N-cyclopropylmethyl-6-demethoxy-6-(1-pyrrolidinyl)nororipavine*

The general procedure of Example 3 is repeated. By treatment of 3-acetyl-N-cyclopropylmethylnormorphinone with an excess of pyrrolidine, followed by heating in benzene, 3 - acetyl-N-cyclopropylmethyl-6-demethoxy-6-(1-pyrrolidinyl)nororipavine is thereby obtained.

EXAMPLE 17

*Preparation of N-phenethyl-6-demethoxy-6- (1-pyrrolidinyl)northebaine*

The general procedure of Example 3 is repeated. By treatment of N-phenethylnorcodeinone with an excess of pyrrolidine, followed by heating in benzene, N-phenethyl-6-demethoxy-6-(1-pyrrolidinyl)northebaine is thereby obtained.

EXAMPLE 18

*Preparation of N-phenethyl-6-demethoxy-6- (1-pyrrolidinyl)nororipavine*

By following the procedure of Example 3 except that an equivalent amount of N-phenethylnormorphinone is used in place of the codeinone of that example, there is obtained N - phenethyl - 6 - demethoxy-6-(1-pyrrolidinyl) nororipavine.

EXAMPLE 19

*Preparation of 6-demethoxy-6-morpholino-oripavine*

By following the procedure of Example 5 except that an equivalent amount of morphinone is used in place of the codeinone of that example, there is obtained 6-demethoxy-6-morpholino-oripavine.

EXAMPLE 20

*Preparation of 6-demethoxy-6-piperidinothebaine*

By following the procedure of Example 5 except that an equivalent amount of piperidine is used in place of the morpholine of that example, there is obtained 6-demethoxy-6-piperidinothebaine.

EXAMPLE 21

*Preparation of 6-demethoxy-6-dimethylaminothebaine*

By following the procedure of Example 5 except that an equivalent amount of dimethylamine is used in place of the morpholine of that example, there is obtained 6-demethoxy-6-dimethylaminothebaine.

What is claimed is:
1. A compound of the formula:

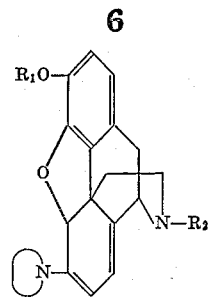

wherein $R_1$ is selected from the group consisting of hydrogen, lower alkyl and lower alkanoyl; $R_2$ is selected from the group consisting of hydrogen, cyano, propargyl, lower alkyl, phenyl lower alkyl, lower alkenyl and lower cycloalkylmethyl; and

is selected from the group consisting of pyrrolidinyl, piperidino, morpholino and di(lower alkyl)amino.

2. A compound according to claim 1 in which $R_1$ is methyl, $R_2$ is methyl, and

is 1-pyrrolidinyl.

3. A compound according to claim 1 in which $R_1$ is hydrogen, $R_2$ is methyl, and

is 1-pyrrolidinyl.

4. A compound according to claim 1 in which $R_1$ is methyl, $R_2$ is hydrogen, and

is 1-pyrrolidinyl.

5. A compound according to claim 1 in which $R_1$ is hydrogen, $R_2$ is hydrogen, and

is 1-pyrrolidinyl.

6. A compound according to claim 1 in which $R_1$ is methyl, $R_2$ is cyano, and

is 1-pyrrolidinyl.

7. A compound according to claim 1 in which $R_1$ is acetyl, $R_2$ is methyl, and

is 1-pyrrolidinyl.

8. A compound according to claim 1 in which $R_1$ is methyl, $R_2$ is methyl, and

is morpholino.

9. The method of preparing a compound according to claim 1 which comprises heating a compound of the formula:

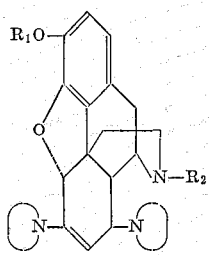

wherein $R_1$, $R_2$ and

are as defined in claim 1, in an inert solvent at a temperature of from about 80° C. to about 150° C.

10. The compound 6,8-bis-(1-pyrrolidinyl)-$\Delta^6$-codide methanolate.

References Cited by the Examiner

UNITED STATES PATENTS 3,135,758  6/1964  Fishman _____ 260—285

OTHER REFERENCES

Fieser et al., Adv. Organic Chemistry, Reinhold, 1961, pages 498–9.

Janssen et al., J. Am. Chem. Soc., volume 78, page 3862 (1956).

ALEX MAZEL, *Primary Examiner.*

DONALD G. DAUS, *Assistant Examiner.*